US012562439B2

(12) United States Patent
Jung et al.

(10) Patent No.: US 12,562,439 B2
(45) Date of Patent: Feb. 24, 2026

(54) APPARATUS AND METHOD OF MANUFACTURING BATTERY MODULE

(71) Applicant: LG ENERGY SOLUTION, LTD., Seoul (KR)

(72) Inventors: Kitaek Jung, Daejeon (KR); Junkyu Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 739 days.

(21) Appl. No.: 17/775,454

(22) PCT Filed: Jul. 23, 2021

(86) PCT No.: PCT/KR2021/009521
§ 371 (c)(1),
(2) Date: May 9, 2022

(87) PCT Pub. No.: WO2022/039396
PCT Pub. Date: Feb. 24, 2022

(65) Prior Publication Data
US 2022/0407193 A1 Dec. 22, 2022

(30) Foreign Application Priority Data

Aug. 20, 2020 (KR) ........................ 10-2020-0104857

(51) Int. Cl.
*H01M 50/54* (2021.01)
*H01M 10/04* (2006.01)
(Continued)

(52) U.S. Cl.
CPC ....... *H01M 50/54* (2021.01); *H01M 10/0481* (2013.01); *H01M 10/653* (2015.04);
(Continued)

(58) Field of Classification Search
None
See application file for complete search history.

(56) References Cited

U.S. PATENT DOCUMENTS

2013/0029192 A1* 1/2013 Oya ..................... H01M 10/425
429/61
2013/0108909 A1 5/2013 Matsuo et al.
(Continued)

FOREIGN PATENT DOCUMENTS

CN 102934259 A 2/2013
CN 107771366 A 3/2018
(Continued)

OTHER PUBLICATIONS

International Search Report for PCT/KR2021/009521 mailed on Oct. 27, 2021.

*Primary Examiner* — Ula C Ruddock
*Assistant Examiner* — Mary Grace Byram
(74) *Attorney, Agent, or Firm* — Birch, Stewart, Kolasch & Birch, LLP

(57) ABSTRACT

An apparatus of manufacturing a battery module includes a guide plate that wraps a battery cell stack from left and right sides, with the battery cell stack being configured to stack a plurality of battery cells, wherein the guide plate comprises a body part in contact with the battery cell stack, and an insertion part connected to one end part of the body part and bent and protruded to the inner side of the battery cell stack; and the battery cell stack is inserted into the interior of the frame member whose upper part is opened by the insertion part.

12 Claims, 5 Drawing Sheets

(51) Int. Cl.

| | |
|---|---|
| *H01M 10/653* | (2014.01) |
| *H01M 50/20* | (2021.01) |
| *H01M 50/211* | (2021.01) |
| *H01M 50/249* | (2021.01) |

(52) U.S. Cl.
CPC ......... *H01M 50/20* (2021.01); *H01M 50/211* (2021.01); *H01M 50/249* (2021.01); *H01M 2220/20* (2013.01)

(56) References Cited

U.S. PATENT DOCUMENTS

| | | | |
|---|---|---|---|
| 2013/0337310 A1* | 12/2013 | Omura ................ | H01M 50/289 |
| | | | 29/890.03 |
| 2016/0372736 A1* | 12/2016 | Kim ......................... | B60L 50/64 |
| 2017/0062782 A1* | 3/2017 | Cho .................... | H01M 50/293 |
| 2017/0283565 A1* | 10/2017 | Ono ....................... | H01G 11/52 |
| 2018/0175468 A1* | 6/2018 | Shin .................. | H01M 10/6556 |
| 2019/0131596 A1 | 5/2019 | Yang et al. | |
| 2019/0181485 A1 | 6/2019 | Baeck et al. | |
| 2019/0259987 A1 | 8/2019 | Tate | |
| 2019/0267591 A1 | 8/2019 | Park et al. | |
| 2020/0176745 A1* | 6/2020 | Lee .................... | H01M 50/569 |
| 2020/0259141 A1 | 8/2020 | Hawwa et al. | |
| 2020/0303697 A1 | 9/2020 | Kim et al. | |
| 2020/0373608 A1 | 11/2020 | Kim et al. | |
| 2021/0135176 A1* | 5/2021 | An ....................... | H01M 10/647 |
| 2023/0041000 A1* | 2/2023 | Tandon .............. | H01M 50/249 |

FOREIGN PATENT DOCUMENTS

| | | | | |
|---|---|---|---|---|
| CN | 110114906 A | 8/2019 | | |
| CN | 110915019 A | 3/2020 | | |
| JP | 2013-98140 A | 5/2013 | | |
| JP | 2019-145396 A | 8/2019 | | |
| JP | 2020-87704 A | 6/2020 | | |
| KR | 10-2015-0043725 A | 4/2015 | | |
| KR | 10-2017-0025493 A | 3/2017 | | |
| KR | 10-2018-0071800 A | 6/2018 | | |
| KR | 10-2019-0068973 A | 6/2019 | | |
| KR | 10-2019-0069044 A | 6/2019 | | |
| KR | 10-2015901 B1 | 8/2019 | | |
| KR | 10-2019-0108380 A | 9/2019 | | |
| KR | 10-2019-0136227 A | 12/2019 | | |
| KR | 10-2019-0136228 A | 12/2019 | | |
| KR | 10-2020-0030967 A | 3/2020 | | |
| WO | WO-2019098491 A1 * | 5/2019 | ............. | G01R 31/36 |

* cited by examiner

[FIG. 1]
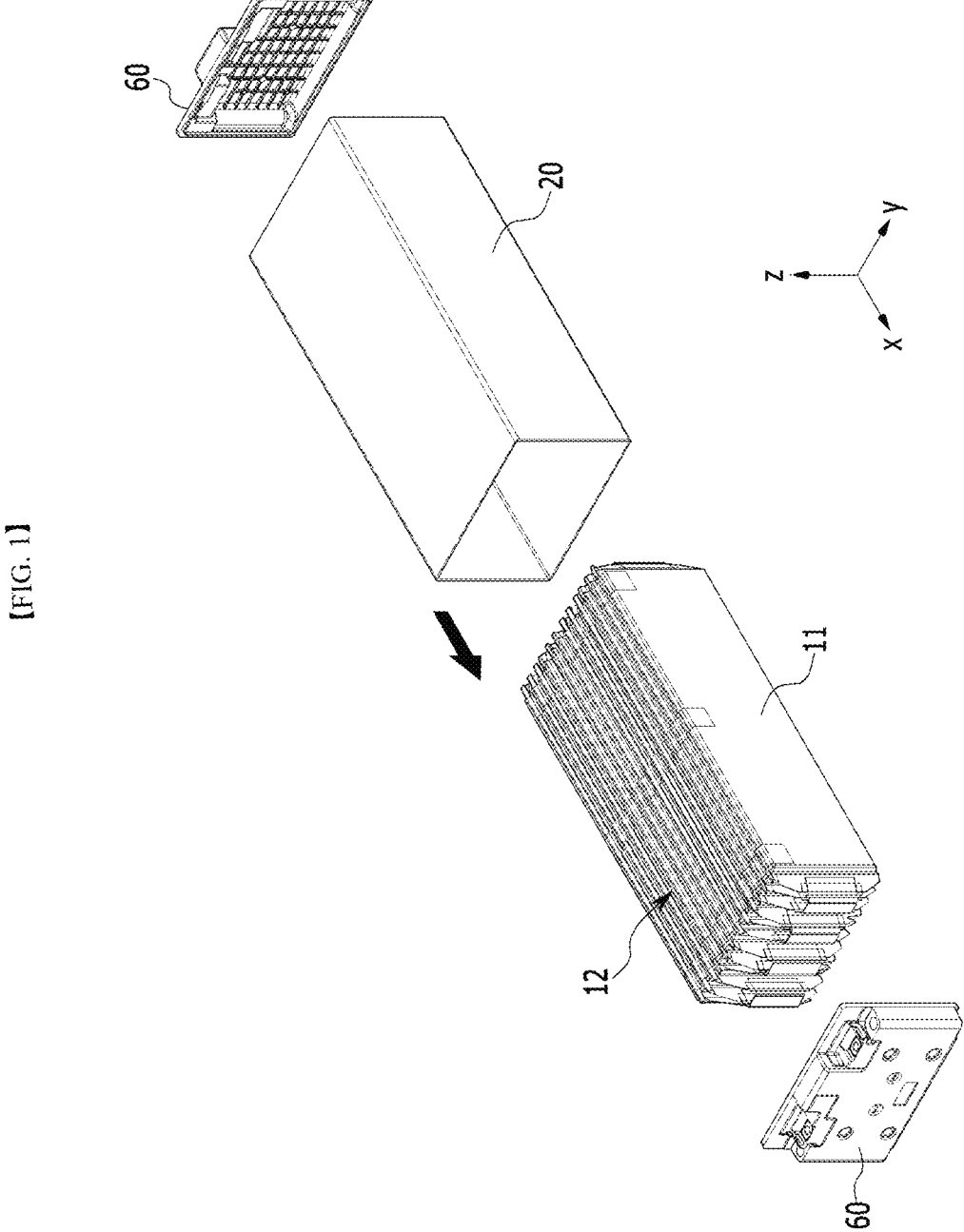

【FIG. 2】
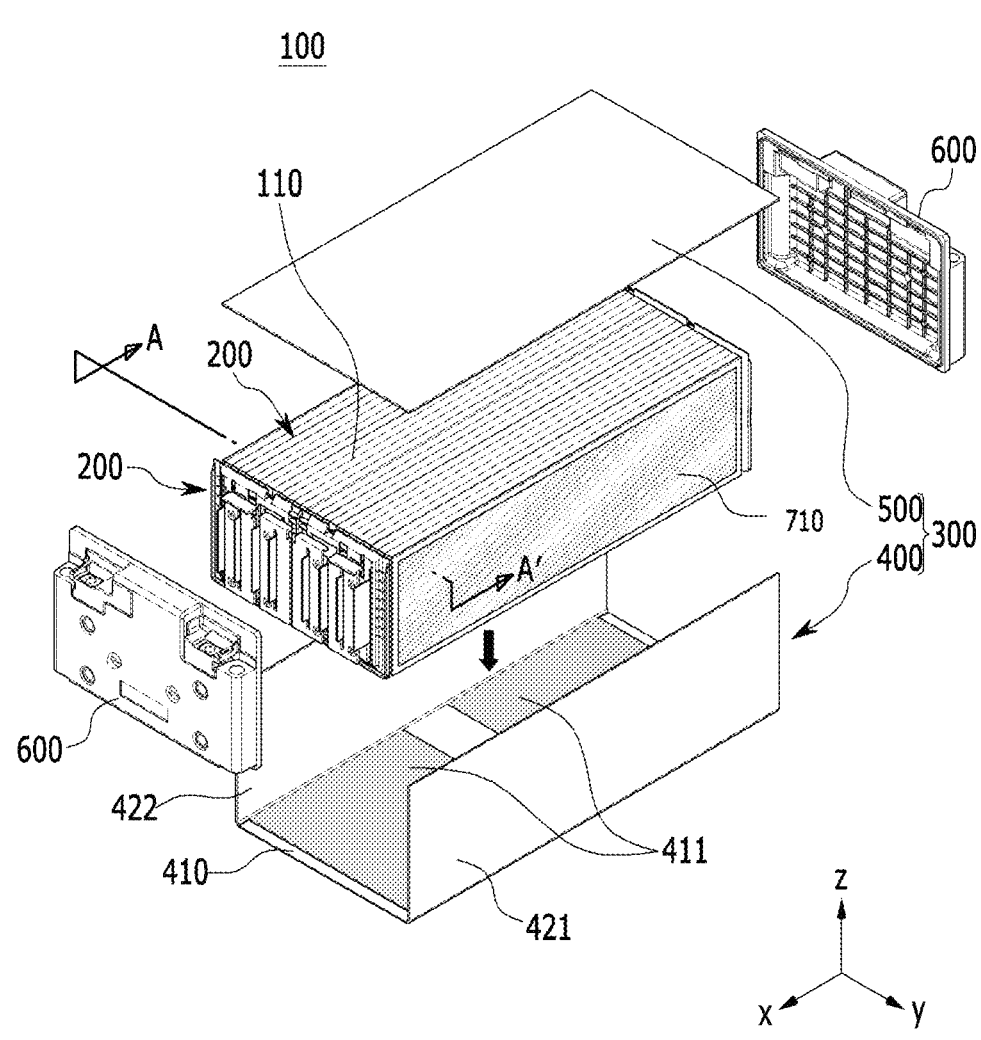

【FIG. 3】
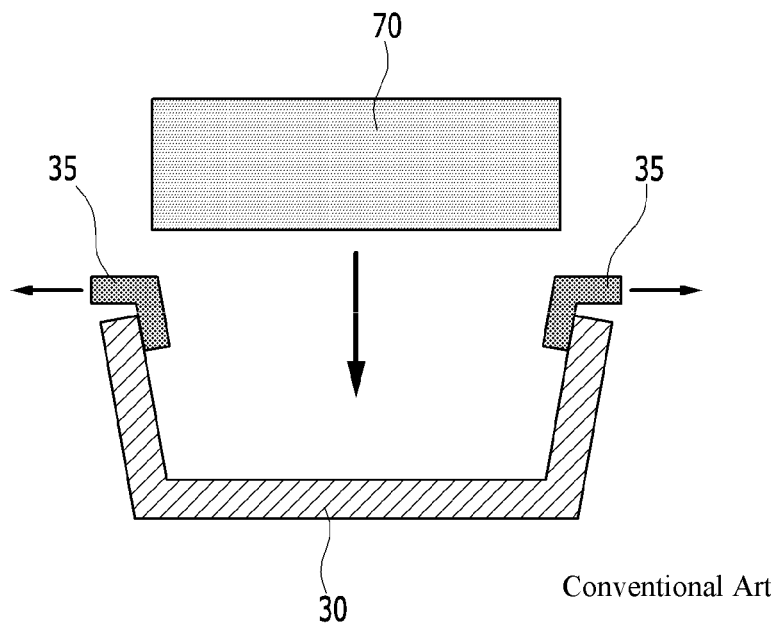
70
35        35
30
Conventional Art
【FIG. 4】
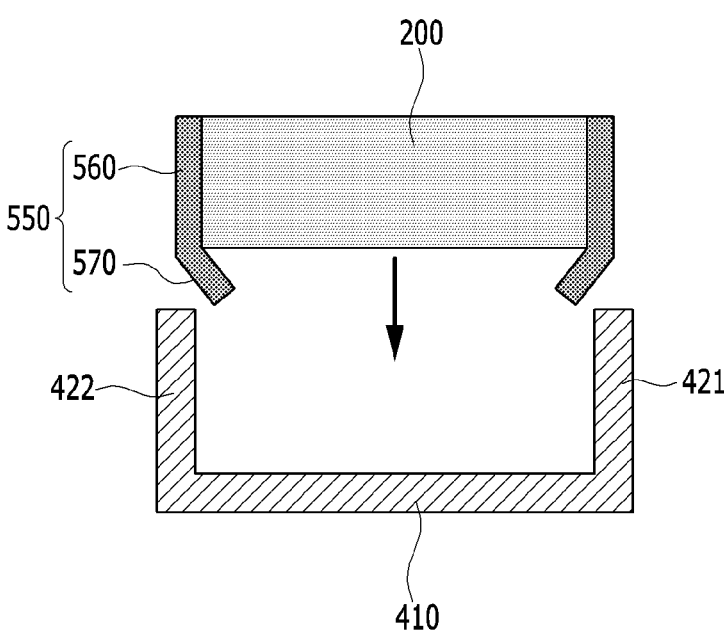
200
560
550
570
422        421
410

【FIG. 5】
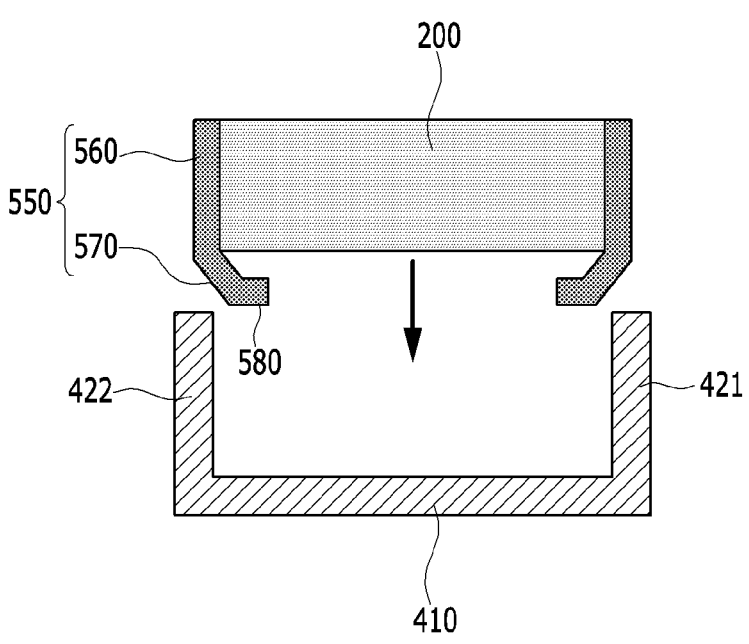

[FIG. 6]

APPARATUS AND METHOD OF MANUFACTURING BATTERY MODULE

CROSS CITATION WITH RELATED APPLICATION(S)

This application claims the benefit of Korean Patent Application No. 10-2020-0104857 filed on Aug. 20, 2020 with the Korean Intellectual Property Office, the disclosure of which is incorporated herein by reference in its entirety.

TECHNICAL FIELD

The present disclosure relates to an apparatus and method of manufacturing a battery module, and more particularly, to an apparatus and method of manufacturing a battery module having improved process performance.

BACKGROUND

Secondary batteries, which are easily applicable to various product groups and has electrical characteristics such as high energy density, are universally applied not only for a portable device but also for an electric vehicle or a hybrid electric vehicle, an energy storage system or the like, which is driven by an electric driving source. Such secondary battery is attracting attention as a new environment-friendly energy source for improving energy efficiency since it gives a primary advantage of remarkably reducing the use of fossil fuels and also does not generate by-products from the use of energy at all.

Small-sized mobile devices use one or several battery cells for each device, whereas middle or large-sized devices such as vehicles require high power and large capacity. Therefore, a middle or large-sized battery module having a plurality of battery cells electrically connected to one another is used.

The middle or large-sized battery module is preferably manufactured so as to have as small a size and weight as possible. Consequently, a prismatic battery, a pouch-shaped battery or the like, which can be stacked with high integration and has a small weight relative to capacity, is mainly used as a battery cell of the middle or large-sized battery module. Meanwhile, in order to protect the battery cell stack from external impact, heat or vibration, the battery module may include a frame member of which a front surface and a back surface are opened to house the battery cell stack in an internal space.

FIG. 1 is a perspective view illustrating a battery module having a mono frame according to the related art.

Referring to FIG. 1, the battery module may include a battery cell stack 12 configured to stack a plurality of the battery cells 11, a mono frame 20 of which a front surface and a rear surface are opened so as to cover the battery cell stack 12, and end plates 60 for covering the front surface and the rear surface of the mono frame 20. In order to form such a battery module, it is necessary to horizontally assemble the battery module such that the battery cell stack 12 is inserted into the opened front surface or rear surface of the mono frame 20 along the X-axis direction as illustrated by the arrow in FIG. 1. However, in order to stably perform such a horizontal assembly, a sufficient clearance has to be secured between the battery cell stack 12 and the mono frame 20. Here, the clearance refers to a gap generated by press-fitting and the like. When the tolerance is small, damage to component parts may be generated in a process of horizontally assembling the battery module. Accordingly, the height of the mono frame 20 has to be largely designed in consideration of the maximum height of the battery cell stack 12 and an assembly tolerance in the insertion process, and thus an unnecessarily wasted space may be caused. In order to minimize the assembly tolerance, a guide film may be used, but there is a problem that the guide film is broken during the insertion process or costs due to replacement increase.

DETAILED DESCRIPTION OF THE INVENTION

Technical Problem

It is an object of the present disclosure to provide an apparatus and method of manufacturing a battery module, which improves the speed of inserting a battery cell stack into a frame member and reduces costs.

However, the problem to be solved by embodiments of the present disclosure is not limited to the above-described problems, and can be variously expanded within the scope of the technical idea included in the present disclosure.

Technical Solution

An apparatus of manufacturing a battery module according to one embodiment of the present disclosure includes a battery cell stack comprising a plurality of battery cells, a pair of guide plates on a respective pair of sides of the battery cell stack, wherein each guide plate comprises a body part in contact with the battery cell stack, and an insertion part having a first end connected to a first end of the body part and bent and protruded to the inner side of the battery cell stack and wherein the battery cell stack is inserted into a frame member.

Each frame member includes a bottom part and two side surface parts facing each other, the insertion part includes a first insertion part and a second insertion part corresponding to each of the two side surface parts, and a distance between a second end of the first insertion part and a second end of the second insertion part may be less than the distance between the side surface parts of the frame member.

The pair of guide plates may be formed of a metal material or an insulating member.

The pair of guide plates may be formed of aluminum or reinforced plastic.

Each of the pair of guide plates may further include a base part connected to a second end of the insertion part which is located opposite to the first end of the insertion part connected to the body part.

The apparatus of manufacturing a battery module may further include a compression pad located between each guide plate of the pair of guide plates and the battery cell stack.

Each insertion part may be bent and protruded in the direction in which the compression pad is located, and a distance in a horizontal direction of the protruding insertion part may be equal to or less than a thickness of the compression pad.

An apparatus of manufacturing a battery module may further include an additional compression pad arranged between the plurality of battery cells constituting the battery cell stack, the frame member comprises a bottom part and two side surface parts facing each other, Each insertion part may include a first insertion part and a second insertion part corresponding to each of the two side surface parts, and a distance between a second end of the first insertion part and an end of the second insertion part may be less than the distance between the two side surface parts of the frame member.

The insertion part of each guide plate may extend under the battery cell stack.

Each guide plate may further include a base part extending from a second end of the insertion part.

A method of manufacturing a battery module according to another embodiment of the present disclosure includes inserting a battery cell stack into the interior of a frame member, whose upper part is opened, using a pair of guide plates wrapping left and right sides of the battery cell stack, wherein the frame member includes a bottom part and two side surface parts facing each other, and each guide plate of the pair of guide plates comprises a body part in contact with the battery cell stack, and an insertion part having a first end connected to a first end of the body part and bent and protruded to an inner side of the battery cell stack, and wherein inserting a battery cell stack comprises inserting the battery cell stack while the inclined surface of each insertion part comes first in contact with a respective side surface part of the frame member.

Each insertion part includes a first insertion part and a second insertion part corresponding to each of the two side surface parts, and in inserting the battery cell stack, a distance between a second end of the first insertion part and a second end of the second insertion part may be less than a distance between the side surface parts of the frame member.

The method of manufacturing a battery module may further include sliding and removing the guide plate along at least one of an open front end direction and rear end direction of the frame member.

Advantageous Effects

According to the embodiments of the present disclosure, the battery cell stack can be stacked in the vertical direction, thereby improving the insertion speed, and omitting the existing guide film to reduce the cost.

In addition, the guide plate is applied to the side surface of the battery cell stack, so that the battery cell stack can be naturally inserted into the frame member without forcibly spreading the left and right upper ends of the frame member.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a perspective view illustrating a battery module having a mono frame according to the related art;

FIG. 2 is an exploded perspective view illustrating a battery module according to an embodiment of the present disclosure;

FIG. 3 is a view illustrating an apparatus and method of manufacturing a battery module according to a comparative example of the present disclosure;

FIG. 4 is a view illustrating an apparatus and method of manufacturing a battery module according to an embodiment of the present disclosure;

FIG. 5 is a view illustrating a modified example of the apparatus of manufacturing a battery module of FIG. 4; and FIG. 6 is a cross-sectional view taken along the cutting line A-A' of FIG. 2.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Portions that are irrelevant to the description will be omitted to clearly describe the present disclosure, and like reference numerals designate like elements throughout the specification.

Further, in the figures, the size and thickness of each element are arbitrarily illustrated for convenience of description, and the present disclosure is not necessarily limited to those illustrated in the figures. In the figures, the thickness of layers, regions, etc. are exaggerated for clarity. In the figures, for convenience of description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a portion is referred to as "including" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

FIG. 2 is an exploded perspective view illustrating a battery module according to an embodiment of the present disclosure.

Referring to FIG. 2, the battery module 100 according to one embodiment of the present disclosure includes a battery cell stack 200 configured to stack a plurality of battery cells 110, a module frame 300 for housing the battery cell stack 200, first and second compression pads 710 and 720 that are located on both side surfaces facing each other in the battery cell stack 200 and are arranged in parallel with the battery cell 110.

The battery cell 110 is a secondary battery and may be configured into a pouch-type secondary battery. Such a battery cell 110 may be composed of a plurality of cells, and the plurality of battery cells 110 may be stacked together so as to be electrically connected to each other, thereby forming the battery cell stack 200. Although specifically not illustrated, each of the plurality of battery cells 110 may include an electrode assembly, a battery case, and an electrode lead protruding from the electrode assembly. Meanwhile, as shown in FIG. 2, the plurality of battery cells 110 may be arranged in parallel with both side surfaces 421 and 422 of the frame member 400 and sequentially stacked along the y-axis direction. The frame member 400 may be U-shaped.

The battery cell stack 200 is housed in the module frame 300 having rigidity to protect against external impact and the like.

At this time, the module frame 300 may include a frame member 400 that houses the battery cell stack 200 and is opened in the upper part (z-axis direction), and an upper frame 500 that covers the opened upper part of the frame member 400. The frame member 400 may include a bottom part 410 and first and second side surface parts 421 and 422 extending upward from both opposed ends of the bottom part 410, respectively.

That is, the lower part and both side parts of the battery cell stack 200 are wrapped by the frame member 400, and the upper part of the battery cell stack 200 can be wrapped by the upper frame 500.

The battery cell stack 200 can be mounted inside the module frame 300 by a method in which the battery cell stack 200 is located on the bottom part 410 of the frame member 400, and then the upper surface of the battery cell stack 200 is covered via the upper frame 500.

At this time, the frame member 400 and the upper frame 500 may be joined by welding, but the joining method is not limited thereto and can be implemented through various embodiments.

The end plate 600 can be coupled respectively to the opened front and rear surfaces (x-axis direction and the direction opposite thereto) of the frame member 400 and the upper frame 500 coupled to each other.

The end plate 600 protects various electrical components, including the battery cell stack 200 from external impact, and at the same time guides the electrical connection between the battery cells 110 of the battery cell stack 200 and an external power source.

Meanwhile, the battery cells 110 may be a lithium secondary battery, or a pouch-type secondary battery. Since such pouch-type secondary battery is generally provided in a form in which the electrode assembly is built in a laminate sheet, it has the advantage of high energy density compared to its small size and weight, but has the disadvantage of weak mechanical rigidity. In particular, in the case of the lithium secondary battery, the electrodes become thicker in the process of repeated charging and discharging, or the internal electrolyte may be decomposed by a side reaction to generate gas. At this time, a phenomenon in which the pouch-type secondary battery cell swells due to the electrode expansion or the generated gas is called a 'swelling phenomenon'.

In the present embodiment, the first compression pad 710 and the second compression pad 720 are respectively arranged on both side surfaces facing each other in the battery cell stack 200. The battery cells 110 can be strongly pressed from the initial stage through such first and second compression pads 710 and 720, and the thickness expansion due to swelling becomes relatively small, thereby capable of preventing the performance deterioration of the battery cell 110 due to the swelling phenomenon and reducing the change in the external shape of the battery module 100.

The first and second compression pads 710 and 720 may include polyurethane foam so as to be able to suppress the swelling phenomenon.

Meanwhile, when the first and second compression pads 710 and 720 are respectively arranged on both side surfaces facing each other in the battery cell stack 200, a double-sided tape is provided between the battery cell stack 200 and the first and second compression pads 710 and 720, so that the first and second compression pads 710 and 720 can be primarily fixed to the battery cell stack 200.

Further, the first and second compression pads 710 and 720 can be fixed by using an adhesive sprayed instead of a double-sided tape. Specifically, the adhesive may be sprayed on both side surfaces facing each other in the battery cell stack 200, and then, the first and second compression pads 710 and 720 can be attached thereon. The adhesive can be sprayed from a nozzle by a pressure pump in a molten form at a high temperature.

Figure 6:
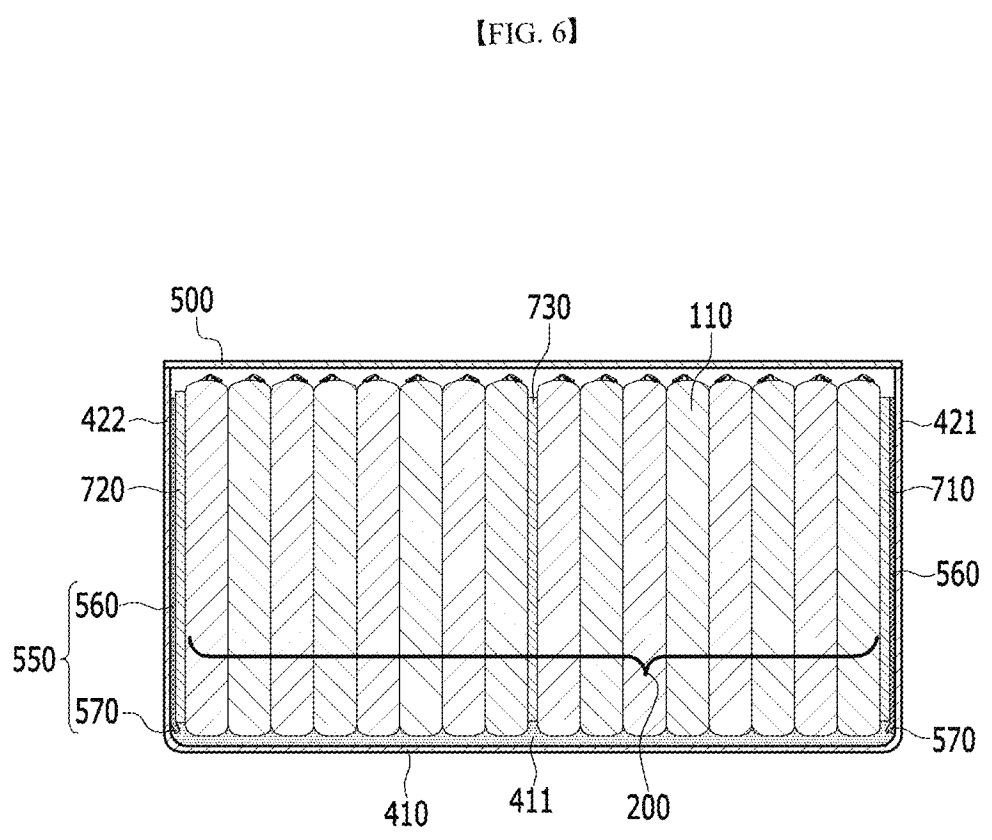

Meanwhile, in addition to the first and second compression pads 710 and 720, an additional compression pad 730 can be arranged between the battery cells 110 constituting the battery cell stack 200. Although only one additional compression pad 730 is illustrated in FIG. 6, a compression pad can be further arranged between other battery cells 110.

Meanwhile, the battery cell stack 200 can be located on the bottom part 410 of the frame member 400 via the opened upper surface (z-axis direction) of the frame member 400. At this time, a defect may occur in which the first compression pad 710 and the second compression pad 720 are rolled up by a first side surface part 421 and a second side surface part 422, respectively. Such a defect has a great adverse effect on the automated process for manufacturing the battery module 100. In order to prevent such defects, the step of inserting the battery cell stack can be performed using a device such as an opening jig.

FIG. 3 is a view illustrating an apparatus and method of manufacturing a battery module according to a comparative example of the present disclosure.

Referring to FIG. 3, in the apparatus and method of manufacturing a battery module according to a comparative example, both side surface parts of the module frame 30 can be forcibly spread using the opening jig 35 before the battery cell stack 70 is mounted to the bottom part of the module frame 30. The battery cell stack 70 can be inserted into the bottom part of the module frame 30 in a state in which both side surface parts of the module frame 30 are forcibly spread by the opening jig 35. However, if the spreading amount is large according to the width and height of the module frame 30, there is a problem in that it may be permanently deformed outside the elastic limit.

Thus, the battery module 100 according to the present embodiment attempted to solve the above-described defect in the manufacturing process by providing a device capable of minimizing the spreading amount of the module frame, the details of which will be described later.

FIG. 4 is a view illustrating an apparatus and method of manufacturing a battery module according to an embodiment of the present disclosure.

Referring to FIG. 4, the apparatus of manufacturing a battery module according to the present embodiment includes a guide plate 550 that wraps the battery cell stack 200 from left and right sides. The guide plate 550 may include a body part 560 in contact with the battery cell stack 200, and an insertion part 570 connected to one end part of the body part 560, and bent and protruded to the inside of the battery cell stack 200. In a state in which the guide plate 550 according to the present embodiment is supported by the battery cell stack 200, the insertion part 570 can be first inserted into the interior of the U-shaped frame member.

The guide plate 550 according to the present embodiment may be formed of a metal material or an insulating member. Specifically, the guide plate 550 may be formed of aluminum, reinforced plastic, or the like. The guide plate 550 can have a level of rigidity that allows the battery cell stack 200 to ride over the side surface parts 421 and 422 of the frame member as if the battery cell stack 200 slides, without forcibly spreading the U-shaped frame.

According to the present embodiment, the guide plates 550 are supported on both side surface parts of the battery cell stack 200, respectively, and the insertion part 570 of the guide plate 550 may include a first insertion part and a second insertion part that are located on both side surface parts of the battery cell stack 200, respectively. At this time, the distance between the end of the first insertion part and the end of the second insertion part may be shorter than the distance between the side surface parts 421 and 422 of the frame member.

A method of manufacturing a battery module using the above-mentioned battery module manufacturing apparatus will be described.

The method of manufacturing a battery module according to another embodiment of the present disclosure includes the step of inserting a battery cell stack 200 into the interior of a frame member 400, whose upper part is opened, using a guide plate 550 wrapping the left and right sides of the battery cell stack 200. At this time, the step of inserting a battery cell stack 200 may include inserting the battery cell stack 200 while the inclined surface of the insertion part 570 comes first in contact with the side surface part 422 of the frame member.

Subsequently, the guide plate 550 can be removed by sliding it in the longitudinal direction of the battery module. The longitudinal direction of the battery module may mean the length of the battery module 100 shown in FIG. 2 along the x-axis direction. The entire guide plate 550 can be slid to the front or rear end of the battery module 100. The guide plate 550 is separated from the center in the longitudinal direction of the battery module 100, and the separated parts can be slid to the front end and the rear end of the battery module 100, respectively. In this manner, the guide plate 550 can be slid along the front end and/or rear end direction of the frame member 400 to be removed from the battery module 100.

Thereafter, the upper frame 500 is formed on the battery cell stack 200 so as to cover the opened upper part of the frame member 400, and the upper frame 500 can be coupled to the frame member 400 by a method such as welding. The end plate 600 can be coupled to the opened front and rear surfaces (x-axis direction and the direction opposite thereto) of the frame member 400 and the upper frame 500 coupled to each other, respectively.

As described above, according to the apparatus and method of manufacturing a battery module according to the present embodiment, regardless of the width and height of the U-shaped frame member, it can be assembled within the elastic limit of the module frame material, and the step of spreading the frame member can be omitted and the process time can be shortened.

FIG. 5 is a view illustrating a modified example of the apparatus of manufacturing a battery module of FIG. 4.

Referring to FIG. 5, most of the configuration is the same as that of the battery module manufacturing apparatus described with reference to FIG. 4, but the guide plate 550 can further include a base part 580. The base part 580 is connected to the other end of the insertion part 570 that is located opposite to one end of the insertion part 570 connected to the body part 560. The base part 580 can extend in a direction parallel to the bottom surface of the battery cell stack 200, and the battery cell stack 200 can be inserted into the U-shaped frame to perform the function capable of being stably mounted on the bottom part 410.

FIG. 6 is a cross-sectional view taken along the cutting line A-A' of FIG. 2.

Referring to FIGS. 2 and 6, the guide plate 550 can be arranged outside the first and second compression pads 710 and 720 arranged on both edges of the battery cell stack 200. More specifically, the guide plate 550 can be located between the first compression pad 710 and a side surface part 421 of the module frame, and between the second compression pad 720 and a side surface part 422 of the module frame. The guide plate 550 can also be removed before covering the upper frame 500.

According to the present embodiment, the guide plate 550 is located between the module frame and the first and second compression pads 710 and 720, so that in the assembly process, the battery cell stack 200 can be stored more easily than in the U-shaped frame 400. Further, the insertion part 570 of the guide plate 550 can be bent and protruded in the direction in which the compression pads 710 and 720 are located. At this time, the horizontal distance of the protruding insertion part 570 may be equal to or shorter than the thickness of the compression pads 710 and 720. Therefore, the insertion part 570 is mounted on the heat conductive resin layer 411 described later, so that the heat generated in the battery cell 110 can be smoothly discharged.

The battery module 100 according to the present embodiment can further include a heat conductive resin layer 411 located on the lower surface of the battery cell stack 200. Further, when one or more battery modules 100 constitute a battery pack, a heat sink can be located at the lower end of the battery module 100.

The heat conductive resin layer 411 can include a heat conductive resin (thermal resin), and can particularly include a heat conductive adhesive material. For example, it contains at least one of a silicone-based material, a urethane-based material, and an acrylic-based material, and it is particularly preferable to include a urethane-based material.

The heat conductive resin is a material having excellent heat conductivity, and the heat generated in the battery cell is discharged to the outside through the heat conductive resin layer 411 and the heat sink. However, the heat conductive resin contains a heat conductive adhesive material, and can be liquid when applied, but can be cured after the battery cell stack 200 is stacked thereon. Therefore, the heat conductive resin layer 411 can fix the battery cell stack 200 in the battery module 100. That is, the heat conductive resin layer 411 in the present embodiment not only improves the heat dissipation characteristics of the battery cell stack 200, but also has the effect of effectively fixing the battery cell stack 200.

The above-mentioned battery module or the battery pack according to the embodiments of the present disclosure can be applied to various devices. Specifically, these devices may be applied to vehicle means such as an electric bicycle, an electric vehicle, a hybrid vehicle, but the present disclosure is not limited thereto and can be applied to various devices that can use the secondary battery.

Although the preferred embodiments of the present disclosure have been described in detail above, the scope of the present disclosure is not limited thereto, and various modifications and improvements made by those skilled in the art using the basic concepts of the present disclosure, which are defined in the appended claims, also falls under the scope of the present disclosure.

[Description of Reference Numerals]

| | |
|---|---|
| 110: battery cell | 200: battery cell stack |
| 300: module frame | 400: frame member |
| 550: guide plate | 560: body part |
| 570: insertion part | 580: base part |
| 710, 720: compression pad | |

The invention claimed is:

1. An apparatus of manufacturing a battery module, comprising:

a battery cell stack comprising a plurality of battery cells;

a pair of guide plates on a pair of outermost sides of the battery cell stack, respectively; and a compression pad located between each guide plate of the pair of guide plates and the battery cell stack, wherein each guide plate comprises a body part in contact with the battery cell stack, and an insertion part having a first end connected to a bottom edge of the body part and bent downwardly and inwardly toward the battery cell stack, wherein the battery cell stack is inserted into a frame member, and wherein each insertion part is bent and protruded toward the compression pad, and a distance in a horizontal direction of the insertion part is equal to or less than a thickness of the compression pad.

2. The apparatus of claim 1, wherein the frame member comprises a bottom part and two side surface parts facing each other, wherein a distance between second ends of the insertion parts is less than the distance between the two side surface parts of the frame member.

3. The apparatus of claim 2, wherein the pair of guide plates is formed of a metal material or an insulating member.

4. The apparatus of claim 3, wherein the pair of guide plates is formed of aluminum or reinforced plastic.

5. The apparatus of claim 1, wherein each of the pair of guide plates further comprises a base part connected to a second end of the insertion part which is located opposite to the first end of the insertion part connected to the body part.

6. The apparatus of claim 1, further comprises an additional compression pad arranged between the plurality of battery cells constituting the battery cell stack.

7. The apparatus of claim 1, wherein the battery module further includes a heat conductive resin layer located on a lower surface of the battery cell stack, the heat conductive resin layer includes a heat conductive adhesive material, and the insertion part is mounted on the heat conductive resin layer.

8. The apparatus of claim 1, wherein the insertion part of each guide plate extends under the battery cell stack.

9. The apparatus of claim 8, wherein each guide plate further comprises a base part extending from a second end of the insertion part.

10. A method of manufacturing a battery module comprising:

inserting a battery cell stack into the interior of a frame member, whose upper part is opened, using a pair of guide plates wrapping left and right sides of the battery cell stack, inserting a compression pad between each guide plate of the pair of guide plates and the battery cell stack, wherein the frame member comprises a bottom part and two side surface parts facing each other, and each guide plate of the pair of guide plates comprises a body part in contact with the battery cell stack, and an insertion part having a first end connected to a bottom edge of the body part and bent downwardly and inwardly toward the battery cell stack, wherein inserting a battery cell stack comprises inserting the battery cell stack while an inclined surface of each insertion part comes first in contact with a respective side surface parts of the frame member, and wherein each insertion part is bent and protruded toward the compression pad, and a distance in a horizontal direction of the insertion part is equal to or less than a thickness of the compression pad.

11. The method of claim 10, wherein each insertion part comprises a first insertion part and a second insertion part corresponding to each of the two side surface parts, and in inserting the battery cell stack, a distance between a second end of the first insertion part and a second end of the second insertion part is less than a distance between the two side surface parts of the frame member.

12. The method of claim 10, further comprising sliding and removing the guide plate along at least one of an open front end direction and rear end direction of the frame member.

* * * * *